United States Patent [19]

Lovely

[11] Patent Number: 4,686,582

[45] Date of Patent: Aug. 11, 1987

[54] HEAD SWITCHING IN HIGH RESOLUTION VIDEO REPRODUCTION APPARATUS

[75] Inventor: John D. Lovely, Rochester, N.Y.

[73] Assignee: Eastman Kodak Company, Rochester, N.Y.

[21] Appl. No.: 816,522

[22] Filed: Jan. 6, 1986

[51] Int. Cl.$^4$ .............................................. H04N 9/87
[52] U.S. Cl. .................................. 358/310; 358/319; 358/323; 358/327
[58] Field of Search ............... 358/310, 315, 319, 320, 358/323; 360/64

[56] References Cited

U.S. PATENT DOCUMENTS

| | | |
|---|---|---|
| 2,916,546 | 12/1959 | Ginsburg et al. |
| 3,152,226 | 10/1964 | Stratton . |
| 3,280,348 | 10/1966 | Jensen . |
| 3,346,702 | 10/1967 | Heizer et al. |
| 3,401,231 | 9/1968 | Baldwin . |
| 3,476,873 | 11/1969 | Boice et al. |
| 3,569,618 | 3/1971 | Inaba et al. |
| 3,580,992 | 5/1971 | Eguchi . |
| 4,120,007 | 10/1978 | Sato ....................................... 360/64 |
| 4,183,067 | 1/1980 | Kinara et al. .......................... 360/75 |
| 4,203,138 | 5/1980 | Elenbaas . |
| 4,328,518 | 5/1982 | Kawata et al. |
| 4,338,631 | 7/1982 | Ota . |
| 4,342,053 | 7/1982 | Hirota . |
| 4,608,609 | 8/1986 | Takano et al. ....................... 358/320 |
| 4,616,270 | 10/1986 | Nishimoto ........................... 358/320 |
| 4,629,929 | 12/1986 | Ichinoi et al. ....................... 358/310 |
| 4,630,131 | 12/1986 | Ichinoi et al. ....................... 358/310 |
| 4,641,201 | 2/1987 | Ichinoi et al. ....................... 358/310 |

Primary Examiner—Donald McElheny, Jr.
Attorney, Agent, or Firm—William F. Noval

[57] ABSTRACT

Video reproduction apparatus records a field of a high resolution time-division-multiplex (TDM) video signal on first and second adjacent tracks on a magnetic tape. A head switch signal is included within the TDM video signal recorded on the tape in order to minimize skew errors which may occur in mid-field when switching between videosignals sequentially played back from the first and second tracks. Each track has recorded thereon a plurality of horizontal lines of color video signals in a time-divisional-multiplex format including a compressed horizontal sync service signal and compressed video component signals arranged in time sequential order. A head switch signal is inserted in the compressed horizontal sync service signal of a designated horizontal line signal at the end of the upper half of the field recorded on the first track. During playback, a head switch detecting circuit detects the head switch signal in the designated line of the upper half field signal to effect a switch during the horizontal sync service interval between the signals played back from the first and second tracks.

6 Claims, 12 Drawing Figures

HEAD SWITCHING IN HIGH RESOLUTION VIDEO REPRODUCTION APPARATUS

BACKGROUND OF THE INVENTION

This invention relates in general to video reproduction apparatus which processes a high resolution time-division-multiplex (TDM) video signal. More particularly, this invention relates to the recording of a field of a high resolution TDM video signal in two adjacent tracks on magnetic tape. A head switch signal is included in the horizontal sync service signal of a horizontal line signal recorded at the end of the first track to effect switching between video signals played back from the first and second tracks in order to minimize skew error and image distortion and degradation problems.

Purchases of video reproduction apparatus and, in particular, video cassette recorders (VCR) have increased dramatically in recent years. All of the popular consumer VCR formats (VHS, Beta, 8 mm) use helical scan recording in order to obtain high writing speeds so that high frequency video signals may be recorded on tape, and in order to attain long recording times (for example, up to 8 hours in the VHS format). Conventionally, a rotating head drum carries a pair of magnetic heads which record a video signal on slant tracks on magnetic tape which is moved past the rapidly rotating magnetic heads. Each head records a field of video signals on a single track. Thus, the two fields of a frame are recorded in two adjacent slant tracks on the tape. In order to reduce cost and complexity of the VCR, the composite video signal is reformatted to separate the chrominance and luminance signals in a frequency fashion, in order to reduce time base errors which result in reproduced image degradation. In addition, the bandwidths of the luminance and chrominance signals are usually reduced to reduce cost and equipment complexity.

In the recording mode, the video signal is conventionally applied to both magnetic heads for a brief overlap period so that the video signal recorded at the end of one track by one magnetic head is also recorded at the start of an adjacent track by the other magnetic head. When the tape is played back during this overlap, the magnetic heads produce two video signals which are fed into two parallel transmission paths only one of which is connected to an output path. A switching signal to connect one or the other of the transmission paths to the output path is developed by magnetic pulse generator coupled to the rotating head drum. Switching between video signals is chosen to fall in the center of the overlap period so that the combined output signal has a uniform envelope, with no interruptions. The head switching is effected near the bottom of the field or in the vertical blanking period. Because of differences in tension on the magnetic tape between the time of recording and the time of playback (i.e. skew error), a loss of horizontal synchronization may occur which results in image distortion and jitter.

Head switching becomes especially critical when a field of a high resolution video signal is recorded on two adjacent tracks on magnetic tape so that switching occurs in the middle of the field. Such a high resolution video reproduction system has been proposed in commonly-assigned, copending U.S. patent application Ser. No. 725,873, by Carl Schauffele, entitled VIDEO REPRODUCTION APPARATUS, filed Apr. 22, 1985.

As disclosed in this patent application, a bi-modal video cassette recorder is selectively operable in a conventional mode at reduced signal bandwidth and in a high resolution time-division multiplex mode at increased signal bandwidth. In the high resolution mode, a field of video signals is recorded on tape which is moved twice as fast as in the conventional format recording, and by means of a magnetic transducer which is rotated at twice the rotational speed as the conventional mode. Thus, in the TDM format, the upper half of a video field is recorded on one track, and the lower of a video field is recorded on an adjacent track. Since head switching between the upper half field signal and the lower half field signal occurs in the middle of the field during playback, any skew errors that result will cause image degradation in the middle of the viewing area of the reproduced image, and will be especially annoying to a viewer who is expecting a high quality, high resolution image.

SUMMARY OF THE INVENTION

According to the present invention, the problem of skew errors resulting from mid-field switching when a high resolution video signal is played back from two tracks of video tape is solved by providing a head switching signal within the recorded video signal. Where the high resolution video signal comprises a time-division-multiplex signal having a compressed horizontal sync service signal and compressed video component signals, according to an aspect of the invention, the head switch signal is produced in the compressed horizontal sync service signal. Thus, when a field of TDM video signal is played back, switching between the upper half video signal and the lower half video signal will be precisely effected during the horizontal sync period. According to another aspect of the invention, the TDM video signal includes a horizontal sync service signal having a compressed horizontal sync signal, a black level reference signal, and a gray level reference signal, and the head switch signal is produced either in the black level reference signal or in the gray level reference signal. This permits recovery of the compressed horizontal sync signal to effect uninterrupted horizontal sychronization of the reproduced video signal while still effecting switching during the horizontal sync service interval.

DESCRIPTION OF THE DRAWINGS

In the detailed description of the embodiment of the invention presented below, reference is made to the accompanying drawings in which like elements are numbered with like numbers.

DESCRIPTION OF THE PREFERRED EMBODIMENT

In the following description relating to a preferred embodiment of the present invention, it is assumed that a standard NTSC composite color video signal is processed by the video reproduction apparatus described. It will be appreciated, however, that other video signal systems such as the PAL, SECAM systems may also be used in accordance with the present invention. In the NTSC format, thirty frames of color video signal are transmitted each second with each frame comprised of two interlaced fields. The composite video signal includes a luminance signal and two chrominance signals which are modulated on a carrier signal and a color subcarrier signal, respectively. As described in the above-mentioned U.S. patent application Ser. No. 725,873, the NTSC format color video signal may be recorded in one of two modes by the video reproduction apparatus therein described. In the conventional mode, the bandwidths of the luminance and chrominance signals of the color video signal are reduced with attendant reduction in the resolution of a reproduced image. In the high resolution, TDM mode of the described video reproduction apparatus, the bandwidths of the luminance and chrominance signals are recorded and played back substantially as broadcast, resulting in a high resolution, high quality image reproduced on a video monitor.

Figure 1:
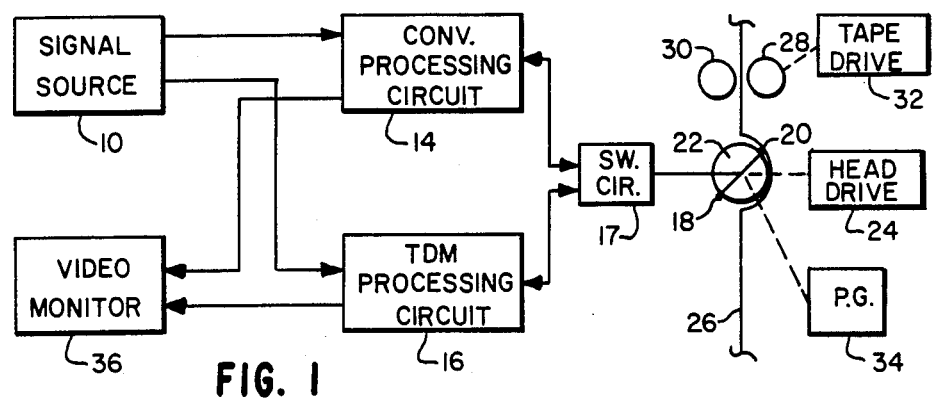
FIG. 1 is block diagram of video reproduction apparatus incorporating a preferred embodiment of the present invention.

Referring now to FIG. 1, there is shown in block diagram a video reproduction apparatus in which the head switching signal concept of the present invention is used. As shown, a video signal source 10 such as a cable, broadcast or satellite transmission source or an originating source such as a camera, provides a composite NTSC color video signal to a video reproduction apparatus 12. The above-mentioned U.S. patent application Ser. No. 725,873, is hereby referred to for a more detailed description of the bi-modal video reproduction apparatus such as apparatus 12 therein disclosed. In general, apparatus 12 includes a conventional format processing circuit 14 and a high resolution, TDM format processing circuit 16. The composite NTSC video signal from source 10 is selectively provided to either circuit 14 circuit 16 by means of a control (not shown). Conventional format processing circuit 14 reformats the composite video signal into a color under signal in which the luminance signal is reduced in bandwidth and modulated on an FM carrier, and the chrominance signal is also reduced in bandwidth and converted to a lower frequency carrier which has a frequency bandwidth outside of the frequency bandwidth of the FM modulated luminance signal. The color-under video signal is then provided by switch circuit 17 to a pair of magnetic heads 18 and 20 mounted on head drum 22 which is rotated by head drive 24, at a first rotational speed preferably of (e.g., 1800 rpm). Helically wrapped about head drum 22 is a length of magnetic tape 26. A capstan 28 in contact with idler roller 30 and driven by tape drive 32 moves tape 26 at a first tape speed past heads 18 and 20.

A pulse generator 34 rotated in synchronism with head drum 22 provides a head signal used for servo control functions and for head switching in the conventional processing circuit 14.

When the conventional format signal is played back, heads 18 and 20 reproduce the video signals recorded on tape 26 and these signals are converted by processing circuit 14 into an NTSC format video signal which is applied to monitor 36 for reproduction of the video image.

Figures 3, 4:
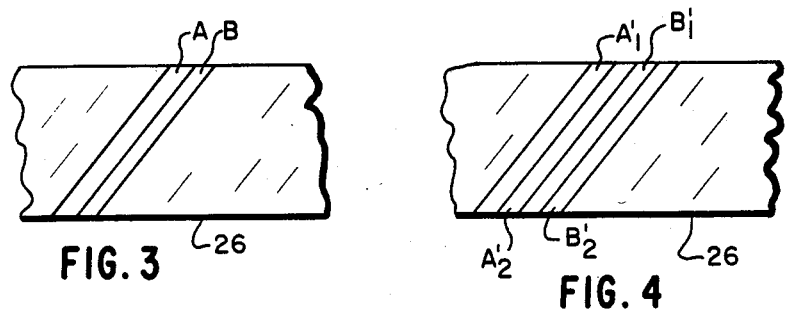
FIGS. 3 and 4 are diagrammatic views of magnetic tape respectively illustrating conventional format recording and TDM format recording.

As disclosed in the aforementioned U.S. patent application Ser. No. 725,873, when apparatus 12 is operated in a high resolution mode, an NTSC format signal supplied to TDM processing circuit 16 is reformatted in a time-division-multiplex format. In the TDM format, the luminance, chrominance and horizontal sync signals are compressed in time and rearranged in a time sequential manner over a horizontal line period. The bandwidths of the luminance and chrominance signals of the NTSC signal are not substantially reduced. Consequently, magnetic heads 18 and 20 carried on head drum 22 are rotated at twice the speed of rotation as in the conventional format, and magnetic tape 26 is moved by capstan 28 at twice the tape speed as in the conventional format. Thus, whereas in the conventional mode the two fields of a frame of color video signals are recorded in two sequential tracks A and B (see FIG. 3) on magnetic tape 26; in the high resolution, TDM format mode, the two fields of TDM signals are recorded on four sequential tracks on magnetic tape 26. Thus, as shown in FIG. 4, the first field of a frame is recorded on two tracks $A'_1$ and $A'_2$ and the second field of the frame is recorded on two tracks $B'_1$ and $B'_2$.

Reference is made to the copending U.S. patent application Ser. No. 725,873 for a more detailed description of conventional processing circuits which may be used in the video reproduction apparatus 12.

Figure 2:
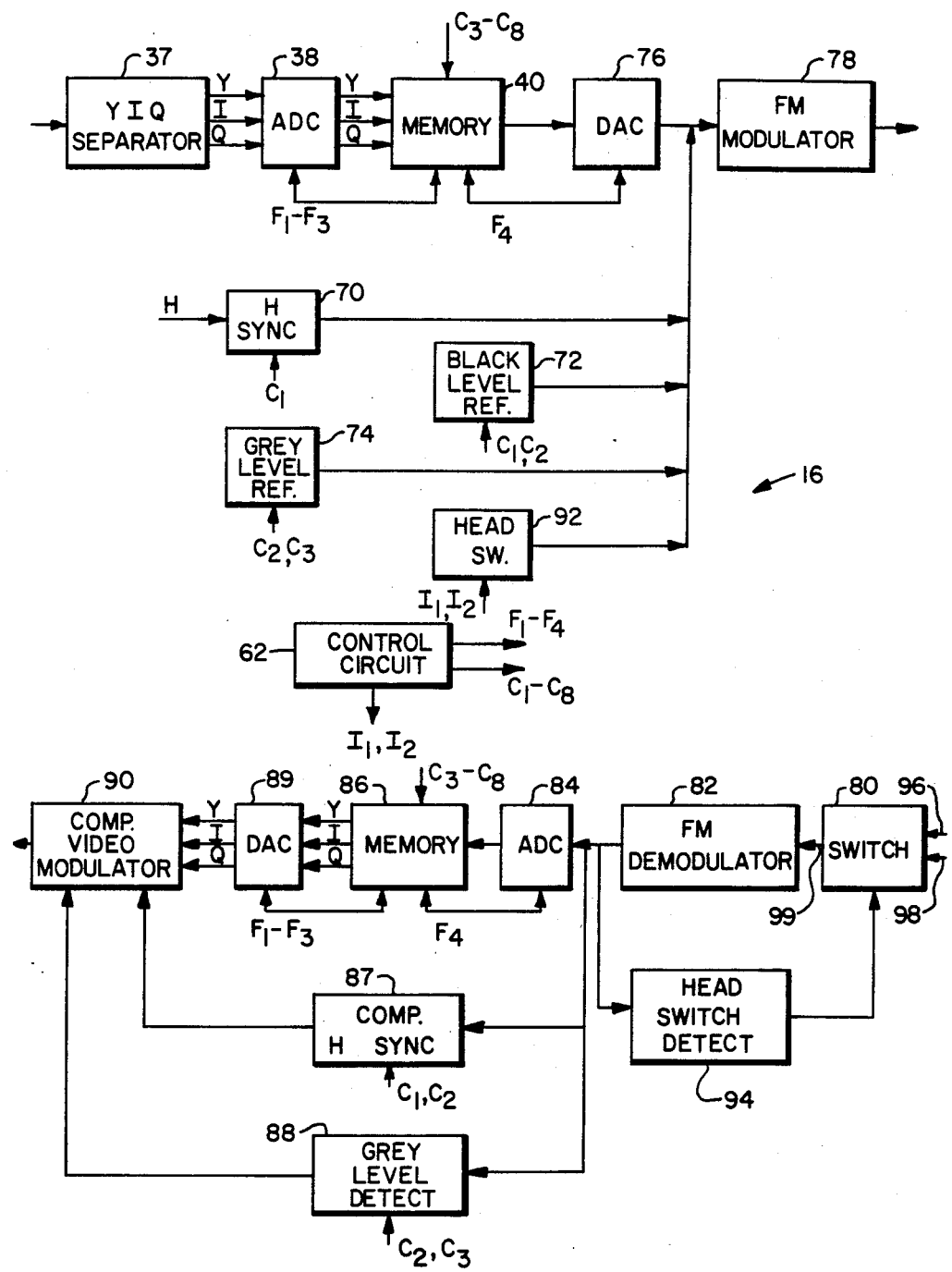
FIG. 2 is a block schematic diagram showing in greater detail the TDM processing circuit of FIG. 1.

Referring now to FIG. 2, there will be described in greater detail the TDM processing circuit 16 of FIG. 1, which includes an embodiment of the present invention. As shown in FIG. 2, TDM processing circuit 16 includes a YIQ separator circuit 37 which receives an NTSC composite video signal from video signal source 10 and separate the luminance (Y) signal and the chrominance (I,Q) signals from the composite video signal. The bandwidths of Y, I and Q signals are not substantially reduced from the bandwidth of the received NTSC signal so that a high resolution signal is available for recording and playback. However, in order to be able to record the broad bandwidths of these video component signals, the time domain of each video component signal is compressed and the time compressed signals are rearranged sequentially in time for recording purposes. To this end, the Y, I, Q component signals are simultaneously applied to analog to digital converter (ADC) 38 which samples each of the base band analog video component signals at suitable sampling frequencies in order to satisfy the sampling theory.

If it is assumed that the Q component signal has a bandwidth of 0.6 MHz, then it is sampled at a frequency $F_1$ of 2.013 MHz; that the I component signal has a bandwidth of 1.3 MHz, then it is sampled at a frequency $F_2$ of 4.027 MHz; and that the Y component signal has a bandwidth of 4.2 MHz, then it is sampled at a frequency $F_3$ of 14.097 MHz. ADC 38 converts the analog video component signals into digital component signals which are stored in digital memory 40 at the respective sampling frequencies $F_1$–$F_3$.

Figure 5A:
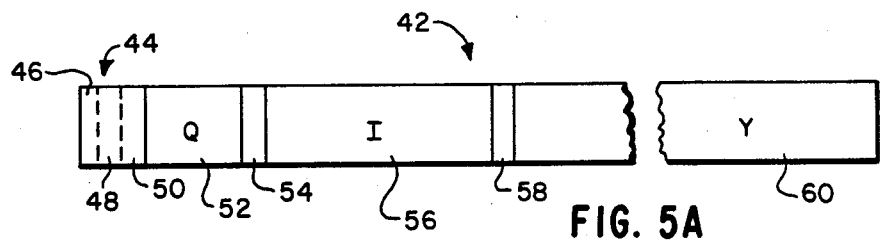
FIG. 5A is an illustrative diagram of a horizontal line of a TDM video signal.

As shown in FIG. 5A, the high resolution TDM signal has a horizontal line duration (which in the NTSC format equals approximately 63.5 msec). TMD signal 42 includes a horizontal sync service signal 44 (having compressed horizontal sync signal 46, black level reference signal 48 and gray level reference signal 50), compressed Q component signal 52, buffer 54, compressed I component signal 56, buffer 58, and compressed Y component signal 60.

As explained in more detail in copending commonly-assigned U.S. patent application Ser. No. 793,820, entitled APPARATUS FOR PROCESSING A TIME DIVISION MULTIPLEX VIDEO SIGNAL HAVING SIGNAL DURATION DIVISIBLE BY THE SAME NUMBER, filed Nov. 1, 1985, the respective TDM signals 46–60 have durations which are a function of the sampling period of the frequency $F_4$ used to time compress the YIQ video component signals. As disclosed in the aforesaid patent application, the compression frequency $F_4$ is chosen to have a frequency of 18.125 MHz, which is an integral multiple of the horizontal line frequency $f_h$ (i.e. 1152 $f_h$). Further according to the invention therein disclosed, each TDM signal duration is divisible by an integral number such as 9 in order to simplify the timing circuit for processing the TDM signal so that such circuit is slower, less complex and less costly. Thus, the frequency $F_5$ for timing the TDM signal is chosen as 1/9 of $F_4$ or 2.014 MHz.

Figure 6:
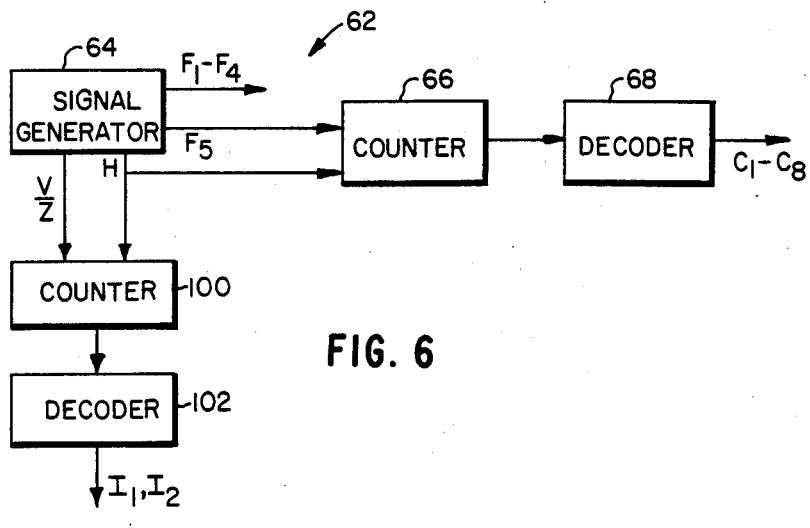
FIG. 6 is a detailed block diagram of the control circuit of FIG. 2.

Production of the TDM signal is controlled by the control circuit 62 (FIG. 2), which is shown in more detail in FIG. 6. As shown, control circuit 62 includes a signal generator circuit 64 which produces signals $F_1$–$F_4$ and counting signal $F_5$. Signal $F_5$ is supplied to counter 66 which at time $T_0$ starts counting periods of signal $F_5$ for the duration of a horizontal line. Counter 66 may, for example, be a seven-bit digital counter whose output is applied to decode circuit 68 (which is described in more detail in the above-mentioned U.S. patent application Ser. No. 793,820). As described, decode circuit 68 comprises a gate array which produces control signals $C_1$–$C_8$ at selected time periods to control the formation of the time sequential signals of the TDM signal.

Figure 5B:
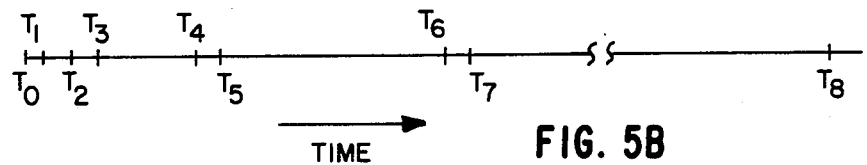
FIGS. 5B and 5C are respectively general and specific timing diagrams for the TDM signal of FIG. 5A.
Figure 5C:
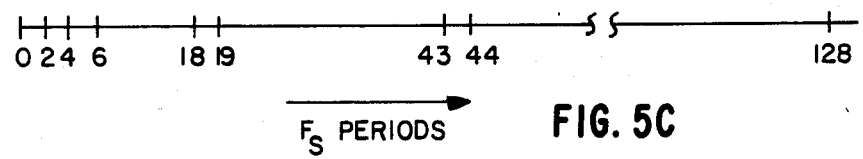
Figure 7A:
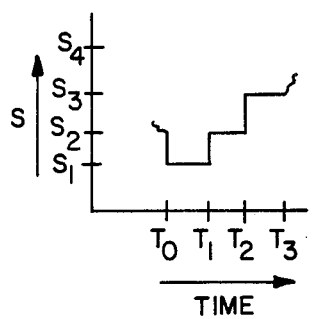
FIG. 7A is a signal value versus time diagram of the compressed horizontal sync service signal of the TDM signal used in the present invention.

Thus, at a time $T_0$ (FIG. 5B) after the Y, I and Q component signals have been written into memory 40, H sync circuit 70 produces compressed H sync 46 (FIG. 5A) at a signal level $S_1$ (FIG. 7A). At a time $T_1$ (count 2-FIG. 5C) control signal $C_1$ is applied to H sync circuit 70 to terminate production of the compressed H sync signal 46 and is also applied to black level reference circuit 72 to initiate production of the black level reference signal 48 at a signal level $S_2$ (FIG. 7A). At time $T_2$ (count 4), control signal $C_2$ terminates production of the black level reference signal 48 and initiates production of the gray level reference signal 50 at a signal level $S_3$ by means of gray level reference circuit 74 (FIG. 2). The gray level reference signal 50 is chosen as having a signal value which is median between the signal value $S_2$ of the black level reference signal and the signal value $S_4$ (maximum white level). At time $T_3$ (count 6), control signal $C_3$ terminates production of the gray level reference signal 50. Circuits 70, 72 and 74 may, for example, include flip flops which are gated by the appropriate control signals C to produce the respective H sync service interval signals shown in FIG. 7A. Control signal $C_3$ also initiates readout of compressed Q component signals from memory 40 at the compression sampling frequency $F_4$. At time $T_4$, control signal $C_4$ (count 18) terminates production of compressed Q signal 52 and initiates a buffer signal 54.

At time $T_5$ (count 19), buffer 54 is terminated and the compressed I signal 56 is initiated. At time $T_6$ (count 43), control signal $C_6$ terminates production of compressed I component signal 56. Another buffer signal 58 is formed from time $T_6$ to $T_7$ (counts 43–44). At time $T_7$ (count 44), control signal $C_7$ initiates production of the compressed Y component signal 60 which is terminated at time $T_8$ (count 128), by control signal $C_8$ at the end of the horizontal line.

The compressed Y, I and Q component signals read out of memory 40 are converted to corresponding analog signals by digital to analog converter (DAC) 76 (FIG. 2).

The TDM signal is then modulated on an FM carrier by means of FM modulator 78 for recording on magnetic tape 26 by heads 18 and 20.

When apparatus 12 is operated to playback TDM signals which have been recorded on tape 26, heads 18 and 20 sequentially reproduce TDM signals, respectively, from tracks $A'_1$, $A'_2$, $B'_1$, and $B'_2$. The TDM signal is applied to input paths 96 and 98. Switch 80 is actuated (as described below) to pass one or the other signal to output path 99 and demodulator circuit 82. The demodulated TDM signal is digitized by analog to digital converter (ADC) 84 at a compression sampling frequency $F_4$ and the digital samples read into memory 86. The compressed sync signal 46 and black level reference signal 48 are reconstituted in composite H sync circuit 87 to produce a composite horizontal sync signal of NTSC format. The gray level reference signal 50 is detected by gray level detection circuit 88. The detected gray level may be used, for example, as a reference signal during chrominance signal processing.

The Q, I and Y digital signals are read out of memory 86 at their respective expansion sampling frequencies $F_1$–$F_3$ and converted to analog signals by digital to analog converter (DAC) 89. The Q, I, Y analog signals and the composite horizontal sync signal are combined in composite signal modulator 90 to produce an NTSC format video signal which is applied to video monitor 36.

When the apparatus 12 plays back a conventional mode signal, head switching between signals played back from different heads 18 and 20 is effected by pulses produced by pulse generator 34. Such head switching is conventionally effected very close to or within the vertical blanking period so that if skew errors should occur, any image degradation occurs near the bottom of the reproduced image or off-screen.

In the disclosed high resolution TDM format, switching between the upper and lower halves of a field which have been recorded on two separate tracks on magnetic tape occurs in the middle of the field. Since the compressed horizontal sync signal in the TDM format is substantially shorter in duration than the composite video sync signal, a variation in tape tension between recording and playback of the TDM signal may result in a loss of horizontal sync causing image distortion and jitter at the center of attention of a viewer of the image reproduced on a television screen. In the high resolution mode, since the increased bandwidth of the luminance signal results in greater reproduced detail, the distortion and jitter of the image caused by mid-field skew errors is particularly annoying to the viewer.

Figure 7B:
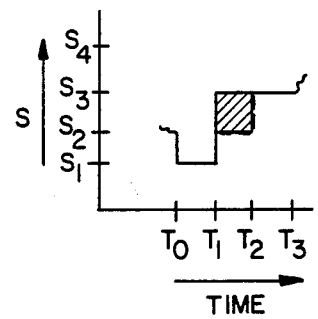
FIGS. 7B and 7C are respectively signal value versus time diagrams of a horizontal sync service signal of a TDM signal in which a horizontal switching signal is respectively produced in the black level reference signal and in the gray level reference signal.
Figure 7C:
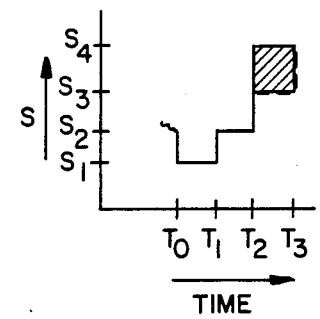

In order to eliminate mid-field switching errors, according to the present invention a head switch signal is produced during the horizontal sync service interval so that switching between signals reproduced from different tracks will be effected within the horizontal sync period and will be controlled very precisely. A head switch producing circuit 92 (FIG. 2) is actuated during either the black level reference signal duration or the gray level reference signal duration to produce a head switch signal within one of these reference level signals. As shown in FIG. 7B, the head switching signal is produced by forming the black level signal at a signal level $S_3$ instead of at a signal level $S_2$. This is illustrated as the shaded portion of the black level reference signal in FIG. 7B. On the other hand, the head switch signal may be produced during the gray level reference signal duration. As shown in FIG. 7C, the gray level reference signal is formed at a signal level $S_4$ instead of $S_3$. This is illustrated as the shaded portion of the gray level reference signal in FIG. 7C. Head switch production circuit 92 may, for example, include a flip-flop circuit which is gated by a control signal $I_1$ (or $I_2$) from control circuit 62 to produce the head switch signal of FIG. 7B (or of FIG. 7C). As shown in FIG. 6, control circuit 62 includes a horizontal line counter 100 which is set at the beginning of each frame of video signal by a frame pulse V/2 from signal generator 64. Counter 100 counts horizontal lines which are decoded by decoder 102 to produce a signal $I_1$ at the beginning of line "132" at the end of the upper half of the first field and at the beginning of the lower half of the first field. A similar signal $I_2$ is produced at the beginning of horizontal line "395" at the end of the upper half of the second field and the beginning of the lower half thereof.

Figure 8:
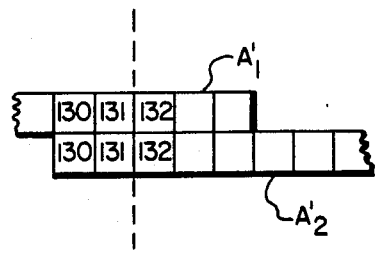
FIG. 8 is a signal diagram illustrating the overlap period of the two video signals representing the upper half and lower half of a field of video signals.

Further according to the present invention, in the playback portion of TDM processing circuit 16, there is provided a head switch detecting circuit 94 which receives the demodulated TDM signal provided by FM demodulator 82. Detection circuit 94 detects the head switch signal and produces a switch actuating signal which is applied to switch 80 to switch the incoming signal passed to output path 99 and FM demodulator 82 from one input path 96 to the other input path 98. As illustrated in FIG. 8, switching between signals played back from tape 26 is shown (by the dashed lines) to be effected after line 131 during the horizontal sync service interval of line 132 so that switching takes place at the end of the track A'1 TDM signal and at the beginning track A'2 TDM signal. Switching at the end of fields may be effected by the head switch signal produced by pulse generator 34, or by similar head switch signals inserted at the end of the lower half fields.

The invention has been described in detail with particular reference to preferred embodiments thereof, but it will be understood that variations and modifications can be effected within the spirit and scope of the invention.

What is claimed is:

1. Video reproduction apparatus comprising:
   circuit means for providing a field of a color video signal having a plurality of horizontal lines in a time-division-multiplex (TDM) format including a compressed horizontal sync service signal and compressed video component signals arranged in time sequential order, said field including a first set of horizontal line signals representing the upper half of said field and a second set of horizontal line signals representing the lower half of said field;
   means for producing a head switch signal in the compressed horizontal sync service signal of designated horizontal line signal at the end of the first set of horizontal line signals;
   magnetic transducer means for recording said TDM format color video signal on magnetic tape such that said first set of horizontal line signals are recorded on a first track on said tape and said second set of horizontal line signals are recorded on a second adjacent track on said tape;
   said magnetic transducer means being operable in a playback mode for sequentially reproducing said first and second sets of horizontal line signals respectively from said first and second tracks on said tape and for providing said first and second sets of signal to first and second input paths;
   switch means electrically coupled between said first and second input paths and an output path; and
   means for detecting said head switch signal in said designated horizontal line at the end of said first set of horizontal line signals and for actuating said switch means to switch the video signal applied to said output path between said first and second input paths such that said switch between paths is effected during the horizontal sync service interval of said designated horizontal line signal containing said head switch signal.

2. The apparatus of claim 1 wherein said circuit means provides said compressed horizontal sync service signal of said designated horizontal line of TDM format color video signal to include a compressed horizontal sync signal and a black level reference signal sequential in time to said compressed horizontal sync signal and wherein said head switch producing means produces said head switch signal in said black level reference signal of said designated horizontal line signal.

3. The apparatus of claim 1 wherein said circuit means provides said compressed horizontal sync service signal of said designated horizontal line of TDM format color video signal to include a compressed horizontal sync signal of a first signal value and a black level reference signal of a second signal value sequential in time to said compressed horizontal sync signal and wherein said head switch producing means produces said head switch signal by changing the signal value of said black level reference signal of said designated horizontal line signal to a third signal value different from said second signal value.

4. The apparatus of claim 1 wherein said circuit means provides said compressed horizontal sync service signal of said designated horizontal line of TDM format video signal to include a compressed horizontal sync signal, a black level reference signal and a gray level reference signal and wherein said head switch producing means produces said head switch signal in said gray level reference signal of said designated horizontal line signal.

5. The apparatus of claim 1 wherein said circuit means provides said compressed horizontal sync service signal of said designated horizontal line of TDM format video signal to include a compressed horizontal sync signal of a first signal value, a black level reference signal of a second signal value and a gray level reference signal of a third signal value and wherein said head switch producing means produces a head switch signal by changing the signal value of said gray level reference signal of said designated horizontal line signal to a fourth signal value different from said third signal value.

6. Video reproduction apparatus comprising:
means for providing magnetic tape having recorded thereon a field of a color video signal having a plurality of horizontal lines in a time-division-multiplex (TDM) format including a compressed horizontal sync service signal and compressed video component signals arranged in time sequential order, said field including a first set of horizontal line signals representing the upper half of said field which is recorded on a first track on said tape and a second set of horizontal line signals representing the lower half of said field which is recorded on a second track on said tape, wherein a head switch signal is provided in the compressed horizontal sync service signal of a designated horizontal line signal at the end of the first set of horizontal line signals;

magnetic transducer means for sequentially reproducing said first and second sets of horizontal line signals respectively from said first and second tracks on said tape and for providing said first and second sets of signals to first and second input paths, respectively;

switch means electrically coupled between said first and second input paths and an output path; and means for detecting said head switch signal in said designated horizontal line signal at the end of said first set of horizontal line signals and for actuating said switch means to switch the video signal applied to said output path between said first and second input paths such that said switch between paths is effected during the horizontal sync service interval of said designated horizontal line signal containing said head switch signal.

\* \* \* \* \*